Figure 4:
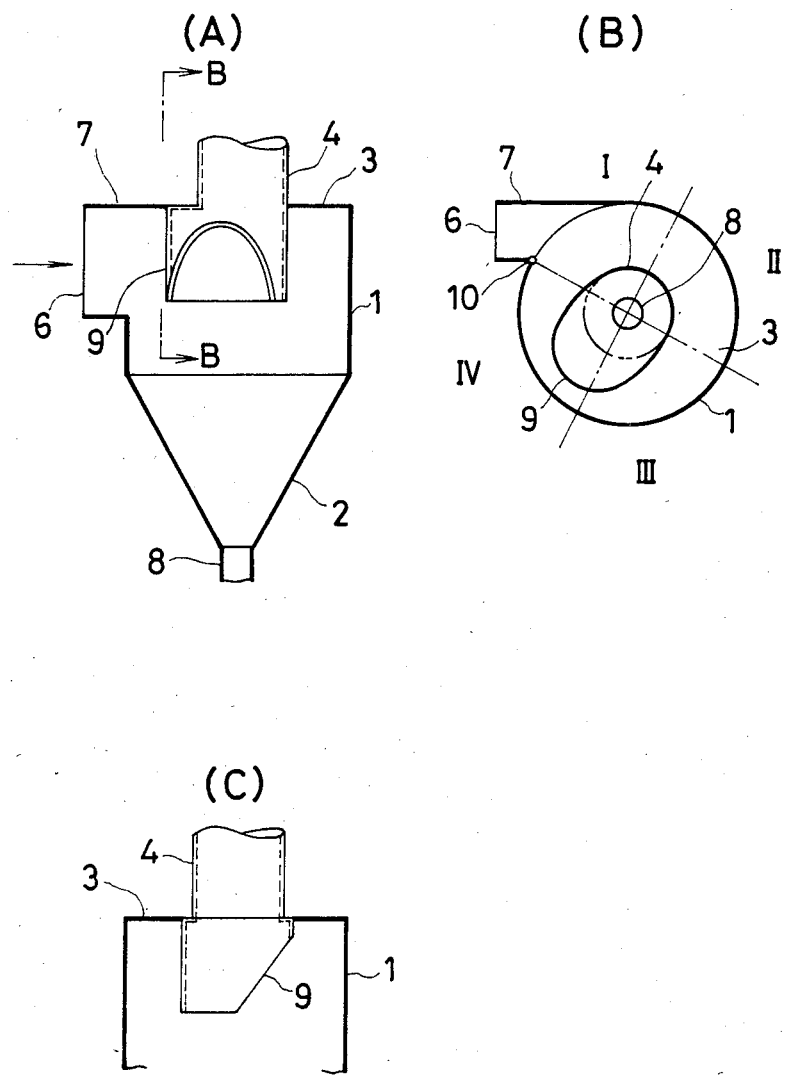

United States Patent [19]

Sasaki et al.

[11] Patent Number: 4,600,417
[45] Date of Patent: Jul. 15, 1986

[54] CYCLONE

[75] Inventors: Atsushi Sasaki; Hiromi Ohsaka, both of Hiroshima; Mitsuharu Murakami, Nagoya; Masahiro Harada, Hiroshima; Hirofumi Hatano, Kitakyuushu; Yoji Hirota, Yokose, all of Japan

[73] Assignees: Mitsubishi Jukogyo Kabushiki Kaisha; Mitsubishi Mining & Cement Co., Ltd., both of Japan

[21] Appl. No.: 615,459

[22] Filed: May 30, 1984

[30] Foreign Application Priority Data

May 30, 1983 [JP] Japan ................... 58-94030

[51] Int. Cl.$^4$ .............................. B01D 45/12
[52] U.S. Cl. ................... 55/413; 55/459 R
[58] Field of Search ........... 55/204, 413, 414, 459 R, 55/459 A, 459 B, 459 C, 459 D

[56] References Cited

U.S. PATENT DOCUMENTS

| 2,590,480 | 3/1952 | Van Der Kolk | 55/413 |
| 3,370,408 | 2/1968 | Lehrer et al. | 210/512.1 |
| 4,366,056 | 12/1982 | Jackson | 210/512.1 |
| 4,519,822 | 5/1985 | Hatano et al. | 55/459 R |

FOREIGN PATENT DOCUMENTS 0196537  4/1923  United Kingdom .............. 55/414

Primary Examiner—Charles Hart
Attorney, Agent, or Firm—McGlew and Tuttle

[57] ABSTRACT

A cyclone comprising a cylindrical portion and an inverted conical portion, the cylindrical portion having a gas inlet connected thereto in its tangential direction and a gas outlet perforated through a ceiling panel thereof, the gas inlet allowing the introduction of a gas including powders therethrough, the inverted conical portion being connected to the cylindrical portion under its lower edge and having a collected powder outlet at the lower end thereof, characterized in that the gas outlet is perforated through the ceiling panel of the cylindrical portion so that the central axis of the gas outlet may be coaxially coincident with the central axis of the cylindrical portion; a cylindrical exhaust gas guide is disposed under the ceiling panel so as to surround the periphery of the gas outlet; and when a cross section of the cylindrical portion is separated into four sectors by an imaginary line passing through an intersection of an inner wall of the gas inlet and the cylindrical portion and passing through the center of the cylindrical portion, and another imaginary line passing through the center of the cylindrical portion and crossing the above-mentioned imaginary line at right angles, and when these four sectors are named a first, a second, a third and a fourth quadrant from the above-mentioned intersection in a gas revolving direction order, the cylindrical exhaust gas guide is formed so that a maximum value of a space between the cylindrical exhaust gas guide and an inner wall of the cylindrical portion may lie in the first quadrant and so that a minimum value of the space therebetween may lie in the fourth quadrant.

3 Claims, 10 Drawing Figures

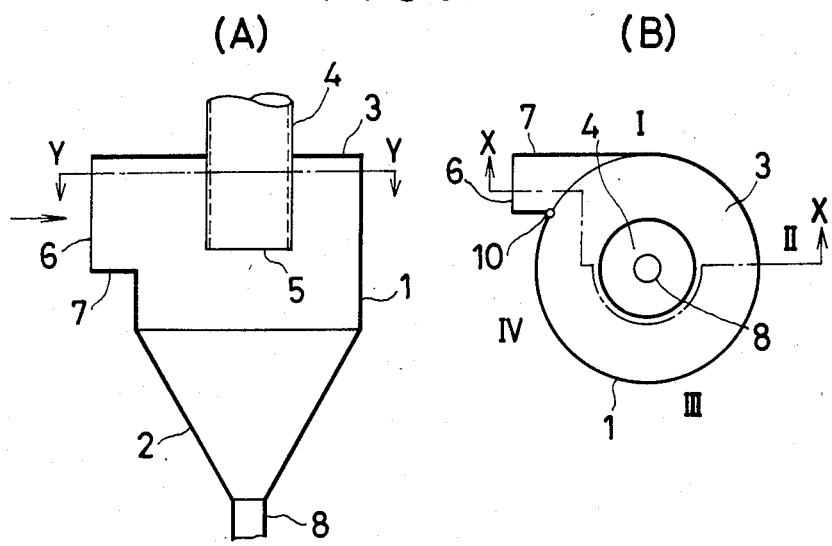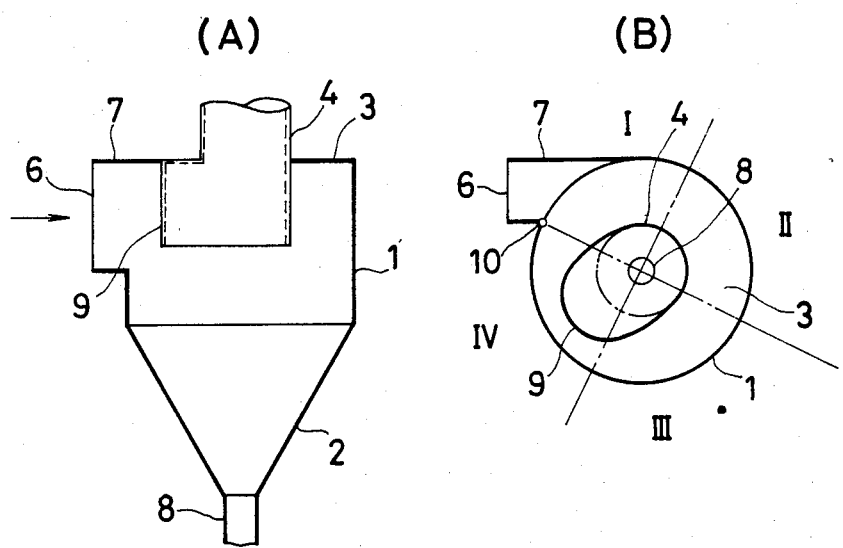

FIG.3
(A) 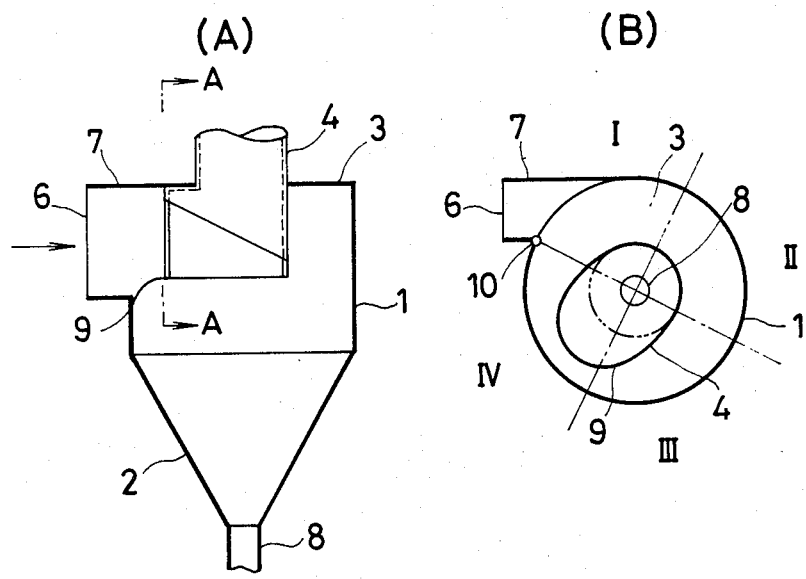  (B)
(C) 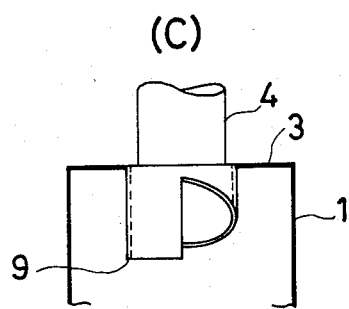

CYCLONE

The present invention relates to an improved cyclone for separating fine powders from a gas including the fine powders.

The cyclones are extensively utilized as dust collectors because of its simplest structure and because of being inexpensive, but they have the drawback that their pressure loss is great. In order to decrease the pressure loss of the cyclone, there have been made attempts such as a change in the shape of the cyclone, a disposition of a variety of guides inside the cyclone, an arrangement of a guide in place of an inner cylinder, and an employment of an eccentric outlet pipe. These attempts can generally provide the effect of decreasing the pressure loss, but tend to lower the efficiency of dust collection. For such a reason, it is now considered that the achievement of the reduction in the pressure loss is difficult without lowering the dust collection efficiency and without enlarging a diameter, a height and the like of the cyclone.

The cyclones are widely used in plants for treating powders, and especially, it is well known that a suspension preheater comprising the cyclones which are vertically superimposed on each other in series and in a multistage manner is employed in order to preheat a cement material.

Heretofore, this type of suspension preheater is generally composed of the four-stage cyclone, but with the intention of improving a thermal efficiency and thus reducing a heat consumption in this zone, a five-stage system in which one stage is additionally increased is now utilized. As be definite from the foregoing, the greater the number of the used cyclones becomes, the larger the thermal efficiency becomes, but simultaneously the more the pressure loss, i.e. an electric power consumption for blast becomes correspondingly. If a retention or a reduction of the pressure loss of the suspension preheater is attempted, it will inevitably be required to lower the pressure loss of the constitutional cyclones. In order to lower the pressure loss of the cyclones, there is one way in which each cyclone is enlarged and wind velocities at an inlet and an outlet of the cyclone are caused to drop. In this case, however, facilities including the cyclones will correspondingly become bulky. Further, with regard to the attempt of changing the shape of the cyclone or adding some members thereto in order to reduce the pressure loss while the size of the cyclone is retained, such an attempt will lead to the deterioration in the efficiency of dust collection, as mentioned above. In this case, although the stage number of the cyclones is increased, an amount of a cycling material between the respective cyclones is great, with the result that the effect of improving the thermal efficiency cannot be accomplished sufficiently.

The present invention is here particularly suggested to satisfy the above-mentioned needs, but, needless to say, it can also be widely applied to the usual dust collectors.

That is to say, the present invention is directed to a cyclone comprising a cylindrical portion and an inverted conical portion, the cylindrical portion having a gas inlet connected thereto in its tangential direction and a gas outlet perforated through a ceiling panel thereof, the gas inlet allowing the introduction of a gas including powders therethrough, the inverted conical portion being connected to the cylindrical portion under its lower edge and having a collected powder outlet at the lower end thereof, characterized in that the gas outlet is perforated through the ceiling panel of the cylindrical portion so that the central axis of the gas outlet may be coaxially coincident with the central axis of the cylindrical portion; a cylindrical exhaust gas guide is disposed under the ceiling panel so as to surround the periphery of the gas outlet; and when a cross section of the cylindrical portion is separated into four sectors by an imaginary line passing through an intersection of an inner wall of the gas inlet and the cylindrical portion and passing through the center of the cylindrical portion, and another imaginary line passing through the center of the cylindrical portion and crossing the above-mentioned imaginary line at right angles, and when these four sectors are named a first, a second, a third and a fourth quadrant from the above-mentioned intersection in a gas revolving direction order, the cylindrical exhaust gas guide is formed so that a maximum value of a space between the cylindrical exhaust gas guide and an inner wall of the cylindrical portion may lie in the first quadrant and so that a minimum value of the space therebetween may lie in the fourth quadrant.

In the case of a preferred embodiment, the cylindrical exhaust gas duct is disposed so that a maximum value of the height of the cylindrical exhaust gas guide may lie in the first quadrant and a minimum value thereof may lie in the third or the fourth quadrant.

Further, it is also a preferable embodiment that the cylindrical exhaust gas guide is formed into an oval shape.

Objects and features of the present invention will be apparent from the following descriprion in reference to the accompanying drawings.

FIG. 1 shows a conventional usual cyclone; FIG. 1 (A) is a vertical section taken along the line X—X in FIG. 1 (B), and FIG. 1 (B) is a cross section taken along the line Y—Y in FIG. 1 (A).

FIGS. 2 to 4 show embodiments of cyclones of the present invention. In the respective drawings, each drawing to which the symbol (A) is attached is a vertical section similar to FIG. 1 (A), and each drawing to which the symbol (B) is attached is a cross section similar to FIG. 1 (B). FIG. 3 (C) is a section taken along the line A—A in FIG. 3 (A), and FIG. 4 (C) is a section taken along the line A—A in FIG. 4 (A).

In the first place, the function of a usual conventional cyclone will be described in reference to FIGS. 1 (A) and 1 (B).

When a gas accompanied by fine powders is blown through a gas inlet 6 of a gas duct 7 into a cyclone in its tangential direction which comprises a cyclone cylindrical portion 1, an inverted conical portion 2, an inner cylinder 5, a ceiling panel 3, a gas outlet 4 and a collected powder outlet 8 as shown in FIGS. 1 (A) and 1 (B), a revolving flow of the gas will develop about the central axis of the cyclone and the fine powders will be thrown toward the walls of the cyclone cylindrical portion 1 and the inverted conical portion 2 in order to accomplish a solid-gas separation. The gas from which the fine powders are almost separated goes up through the inner cylinder 5 while revolving, and is finally discharged from the cyclone through the exhaust outlet 4. On the other hand, the separated fine powders go down along the inner walls of the cylindrical portion 1 and the inverted conical portion 2 and are then discharged through the collected powder outlet 8 at the lower end of the inverted conical portion 2. Incidentally, reference numeral 10 in FIG. 1 (B) represents an end portion of the gas inlet 6.

With regard to a gas flow state, the gas is first introduced into the cylindrical portion 1 through a gas inlet 6 in the tangential direction of the cylindrical portion 1, descends therein while revolving, returns at the bottom of the inverted conical portion 2, and ascends revolving along the central axis of the cyclone. In general, a peripheral velocity of the gas is much great than an axial velocity thereof. Therefore, the gas flow in the cyclone is composed of two eddies of a quasi-free eddy in the peripheral portion and a forced eddy in the central portion therein. Further, an inner pressure in the cyclone is affected by such eddies, and the inner pressure of the peripheral portion is high and that of the central portion is low. If the velocity of the peripheral eddy is great, a pressure difference between the peripheral portion and the central portion will be large to some extent.

Generally, the pressure loss of the cyclone is approximately equal to the pressure difference between the peripheral portion and the central portion in the cyclone. More accurately, the pressure at a point of 60% in the radius of the gas outlet corresponds to the pressure loss of the cyclone outlet, and the pressure difference between the aforementioned pressure and the pressure of the peripheral portion is the pressure loss of the cyclone. The pressure loss of the cyclone mainly results from the fact that most of a kinetic energy which the cyclone eddies have is not converted into a pressure energy, when the eddies are discharged from the cyclone, and the kinetic energy is instead lost in the form of heat. The development of the eddies is impaired, for example, by employing a coarse innner surface or disposing optional obstacles. Further, the interference of the eddy development is also carried out by disposing the gas outlet at a position eccentric to the central axis of the cyclone. If the development of the eddies is impaired, the pressure difference between the peripheral portion and the central portion will correspondingly be reduced. In consequence, it is fair to say that the greater the development of the eddies is, the larger the pressure loss of the cyclone is; the less the development of the eddies is, the smaller the pressure loss is.

Most of recent attempts, as mentioned above, of reducing the pressure loss of the cyclone intend to inhibit the development of the eddies. As a result, the purpose of the reduction in the pressure loss can be achieved, but the separation efficiency of the fine powders is simultaneously lowered disadvantageously, which fact means that an unsatisfactory and unsolved matter is still left in the art.

The present invention has now established with the aim of overcoming the above-mentioned drawback.

The present invention will be described by way of an embodiment in accordance with FIGS. 2 (A) and 2 (B). In these drawings, reference numeral 1 is a cyclone cylindrical portion, and numeral 2 is an inverted conical portion connected to the cylindrical portion 1 under its lower edge and having a collected powder outlet 8 at the lower end thereof. Numeral 3 is a ceiling panel, and this ceiling panel 3 is provided with the gas outlet 4 so that the central axis of the gas outlet 4 may be coaxially coincident with the central axis of the cylindrical portion 1. Numeral 6 is a gas inlet for introducing a gas including powders, and this gas inlet 6 is connected to the cylindrical portion 1 in its tangential direction by virtue of a wall 7.

Reference numeral 9 is a cylindrical exhaust gas guide disposed under the ceiling panel 3 of the cylindrical portion 1 so as to surround the periphery of the gas outlet 4. When a cross section of the cylindrical portion 1 is separated into four sectors by an imaginary line passing through an intersection 10 of an inner wall of the gas inlet 6 and the cylindrical portion 1 and passing through the center of the cylindrical portion 1, and another imaginary line passing through the center of the cylindrical portion 1 and crossing the above-mentioned imaginary line at right angles, and when these four sectors are named a first quadrant I, a second quadrant II, a third quadrant III and a fourth quadrant IV from the above-mentioned intersection 10 in a gas revolving direction order, the cylindrical exhaust gas guide 9 is formed so that a maximum value of a space between the cylindrical exhaust gas guide 9 and an inner wall of the cylindrical portion 1 may lie in the first quadrant I and so that a minimum value of the space therebetween may lie in the fourth quadrant IV.

In addition, the cylindrical exhaust gas guide 9 preferably has an oval shape, but this is not limited.

According to the thus constituted embodiment of the present invention, the central axis of the gas outlet 4 is coaxially coincident with the central axis of the cylindrical portion 1, therefore the central axis of the cyclone cylindrical portion 1 is also coincident with the central axes of eddies therein, with the result that there can be obtained a strength and a shape of the eddies which are scarcely different from those of the conventional cyclone hereinbefore described in reference to FIGS. 1 (A) and 1 (B).

Further, according to the embodiment of the present invention, the space between the exhaust gas guide 9 and the inner wall of the cylindrical portion 1 is maximal in the first quadrant I, which is located near the gas inlet 6, and is minimal in the fourth quadrant IV where one revolving cycle of the gas almost terminates. And the powders relatively uniformly dispersed in the gas are rapidly thrown toward the inner walls during one revolving cycle of the gas from the first quadrant I to the fourth quadrant IV through the second quadrant II and the third quadrant III. Therefore, in the fourth quadrant IV, most powders already reach the walls. Thus, by virtue of setting the space between the exhaust gas guide 9 and the inner wall of the cylindrical portion 1 as mentioned above, an amount of the powders accompanying the gas which is flowing from the lower section of the cylindrical exhaust gas guide 9 to the gas outlet 4 can be remarkably reduced, so that the deterioration in a collection efficiency is prevented.

Moreover, into the cylindrical exhaust gas guide 9, the gas in a forced eddy generated under the gas outlet 4 and a part of the gas in a quasi-free eddy section generated about the forced eddy are together introduced. When the part of the gas in the quasi-free eddy section is discharged through the gas outlet 4, its velocity energy is converted into a pressure energy, in contrast to the forced eddy. Therefore, the pressure loss can be reduced as much as an amount corresponding to the part of the quasi-free eddy gas.

Further, since the space between the exhaust gas guide 9 and the cylindrical portion 1 is narrowed in the fourth quadrant IV, the gas flowing from the fourth quadrant IV to the first quadrant I is constrained to flow downwardly, so that the gas newly introduced through the gas inlet 6 is not affected at all by the already treated gas. Also in this case, the pressure loss can be reduced.

According to comparisons between the conventional cyclone shown in FIGS. 1 (A) and 1 (B) and the cyclone in the embodiment of the present invention, the pressure loss of the present invention was 70 to 80% of that of the conventional cyclone, and the collection efficiency of the cyclone of present invention was 94% the value of which was a little lower than 95% of the conventional one, but the cyclone of the present case showed a practically satisfactory performance.

FIGS. 3 (A) to 3 (C) and FIGS. 4 (A) to 4 (B) show cyclones in each of which the cylindrical exhaust gas guide 9 in the embodiment above described is shortened in the height thereof in the third quadrant III or the fourth quadrant IV, i.e., the exhaust gas guide 9 is arranged so that the maximum height of the guide 9 may lie in the first quadrant I and so that the minimum height thereof may lie in the third quadrant III or the fourth quadrant IV. Also in these cases, the development of the eddies is the same as in the conventional cyclone, i.e. as in the embodiment of FIGS. 2 (A) and 2 (B). In the third quadrant III or the fourth quadrant IV where one cycle of the gas terminates, most of the powders reach the walls, and the gas can be drawn into the exhaust gas guide 9 from the peripheral portion of the guide 9 as well as the lower portion thereof. Therefore, the deterioration in the collection efficiency can be prevented. Furthermore, since an amount of the gas in the quasi-free eddy section which is drawn into the exhaust gas guide 9 is greater than in the above-mentioned embodiment, a pressure recovery percentage is raised, so that the pressure loss is additionally reduced. That is to say, in these cases, the pressure loss was 30 to 50% of that of the conventional one, and the collection efficiency was approximately equal to that of the embodiment shown in FIGS. 2 (A) and 2 (B).

A flowing state of the gas, a behavior of the fine powsers and the like in the cyclone of the present invention above mentioned are not completely grasped yet, but the following points are definite from analytical results at present:

(1) A strength, a shape and a pressure distribution of the eddies in the cyclone are substantially equal to those of the conventional one.

(2) Most of the fine powders reach the inner walls while passing through the first and the second quadrant after introduced through the gas inlet 6, whereby a primary collection is accomplished.

(3) Since the gas is drawn into the cylindrical exhaust gas guide 9 having a greater opening, the uncollected fine powsers are slightly discharged together with the gas. As a result, a secondary collection is worse than in the case of the conventional one.

(4) However, a volume and a velocity of the return and ascendant gas above the collected powder outlet 8 at the lower end of the conical portion 2 are small, and thus an amount of the powders which are flown up again is smaller than in the conventional cyclone. Accordingly, the total collection percentage is equal to that of the conventional one.

(5) A pressure distribution under the cylindrical exhaust gas guide 9 is about the same as in the conventional cyclone, but the pressure loss is 30 to 50% lower than in the conventional one, because 30 to 60% of the pressure recover in the gas guide 9.

What is claimed is:

1. A cyclone comprising a cylindrical portion and an inverted conical portion, the cylindrical portion having a gas inlet connected thereto in its tangential direction and a gas outlet perforated through a ceiling panel thereof, the gas inlet allowing the introduction of a gas including powders therethrough, the inverted conical portion being connected to the cylindrical portion under its lower edge and having a collected powder outlet at the lower end thereof, characterized in that the gas outlet is perforated through the ceiling panel of the cylindrical portion so that the central axis of the gas outlet may be coaxially coincident with the central axis of the cylindrical portion; a cylindrical exhaust gas guide is disposed under the ceiling panel so as to surround the periphery of the gas outlet; and when a cross section of the cylindrical portion is separated into four sectors by an imaginary line passing through an intersection of an inner wall of the gas inlet and the cylindrical portion and passing through the center of the cylindrical portion, and another imaginary line passing through the center of the cylindrical portion and crossing the above-mentioned imaginary line at right angles, and when these four sectors are named a first, a second, a third and a fourth quadrant from the above-mentioned intersection in a gas revolving direction order, the cylindrical exhaust gas guide is formed so that a maximum value of a space between the cylindrical exhaust gas guide and an inner wall of the cylindrical portion may lie in the first quadrant and so that a minimum value of the space therebetween may lie in the fourth quadrant.

2. A cyclone according to claim (1) wherein said cylindrical exhaust gas guide is arranged so that a maximum height of said cylindrical exhaust gas guide may lie in the first quadrant and so that a minimum height thereof may lie in the third quadrant or the fourth quadrant.

3. A cyclone according to claim (1) wherein said cylindrical exhaust gas guide has an oval shape.

* * * * *